H. G. RUSSELL.
Improvement in Bridges.
No. 132,860. Patented Nov. 5, 1872.
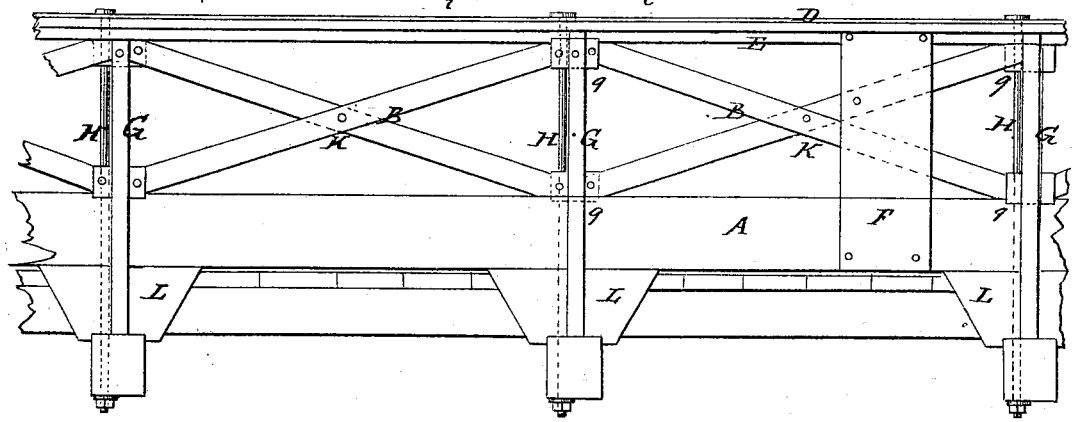
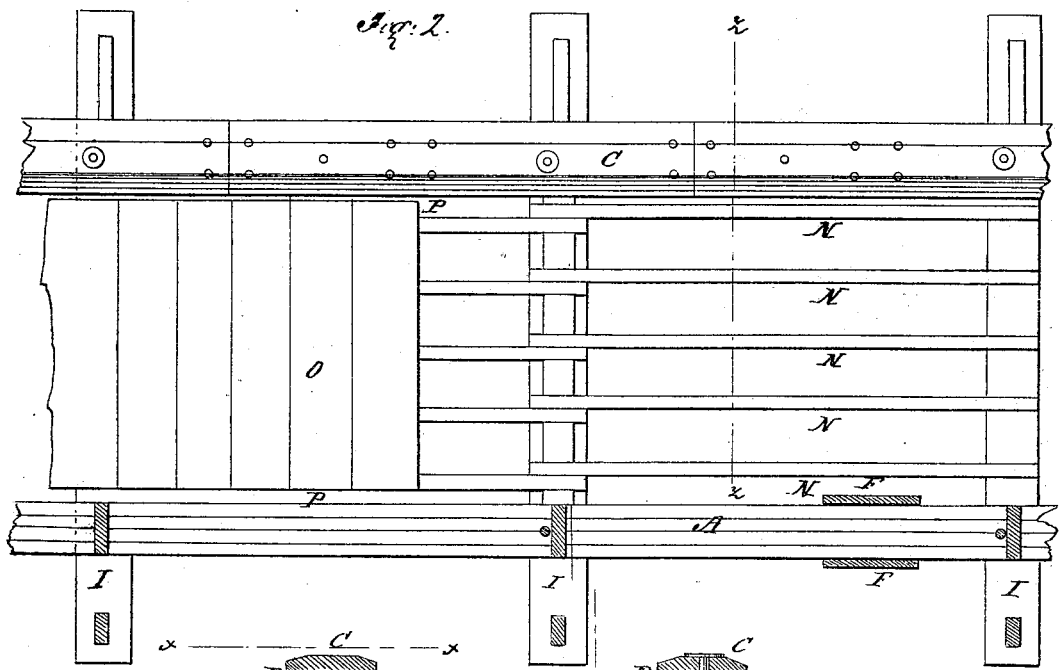
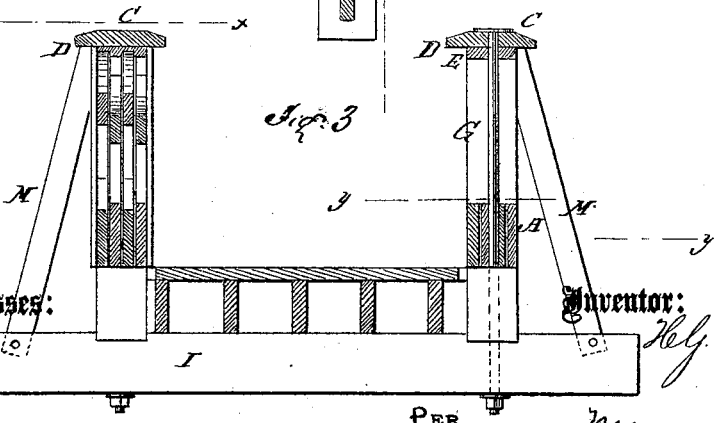

UNITED STATES PATENT OFFICE.

HAMLIN G. RUSSELL, OF LINCOLN, ILLINOIS.

IMPROVEMENT IN BRIDGES.

Specification forming part of Letters Patent No. 132,860, dated November 5, 1872.

*To all whom it may concern:*

Be it known that I, HAMLIN G. RUSSELL, of Lincoln, in the county of Logan and State of Illinois, have invented a new and useful Improvement in Bridges, of which the following is a specification:

My invention consists in arranging the bridge-floor so as to leave a space between it and the lower chords, and so as to be below, or in the same horizontal plane with, the under side of said chords. It also consists in the arrangement of vertical tie-bolts or rods with the braces, cross-beams, and chords, whereby a strong and durable yet comparatively light and inexpensive bridge-skeleton is formed, as hereinafter described.

In the accompanying drawing, Fig. 1 represents a side elevation. Fig. 2 is a plan view, partly in section, as on the lines $x\ x$ and $y\ y$ of Fig. 3. Fig. 3 is a vertical cross-section of Fig. 2 taken on the line Z Z.

Similar letters of reference indicate corresponding parts.

A are the chords of the bridge. B are the braces. C are the plates. The chords are made of joists—four, more or less—secured together with bolts, and are made continuous by splicing for any length of bridge required. The bridge is made in sections of fifteen feet each, more or less, and four and a half feet, more or less, between the chords and the plate. The plates are made in two parts bolted together, marked D and E. The lower part E corresponds in width with the width of the chord and braces, while the upper part D projects and forms a roof to protect the braces and chord when the bridge is sided up. F represents the siding. G represents the stanchion, which in width corresponds with that of the part E of the plate, which is mortised into the chord and supported by an iron bolt, H, which bolts pass down by the side of the stanchion through the entire bridge and support the beams I, as represented. B represents the braces. These braces are doubled and brace in each direction, as represented, being securely bolted together where they intersect, as seen at K. L represents the bolsters upon which the chords rest. There is a bolster notched onto each beam, placed longitudinal with the chord, as represented in the drawing. M is a lateral brace from the end of each beam to the plate, as seen in Fig. 3. N represents the joists which are notched down onto the beam, on which they rest, so that the tops of the joists and the floor are below the bottom of the chords. O represents the floor, so arranged that there is an open space, P, between it and the chord, as seen in the drawing. This arrangement prevents the mud and water on the floor from coming in contact with the chords and causing them to decay. The braces are securely blocked and bolted at their ends, as seen at $g$.

Having thus described my invention, I claim as new and desire to secure by Letters Patent—

1. The arrangement of the floor O, bolsters L, joists N, and chords A, as shown and described, whereby provision is made for discharging water, mud, &c., through the space formed between said floor and chords without coming in contact with the latter.

2. The tie-bolts H, braces B M, stanchions G, and cross-beams I, arranged with the chords A and plates C, as specified.

HAMLIN G. RUSSELL.

Witnesses:
 WILLIAM TOOMEY,
 JAMES T. HOBBIT.